Patented Aug. 28, 1934

1,971,416

UNITED STATES PATENT OFFICE 1,971,416

RECOVERY OF OXIDIZED COPPER

Harmon E. Keyes, Miami, Ariz.

No Drawing. Application July 26, 1932,
Serial No. 624,895

9 Claims. (Cl. 75—18)

In the recovery of oxidized forms of copper it has been proposed to grind the ore to a pulp, leach by agitation with sulphuric acid, precipitate with metallic iron, such as sponge iron, in the pulp and recover the precipitated cement copper by flotation. In some cases it has also been suggested to neutralize the residual acid after precipitation and prior to flotation, using substances such as limestone. Processes have also been proposed for treating discard ferrous sulphate solution with sulphur dioxide and air, thereby producing ferric sulphate and sulphuric acid for leaching oxide or mixed oxide-sulphide ores of copper.

The improvements here described consist of means to definitely control the operation by use of the precipitated and dissolved forms of ferrous iron so as to accomplish the recovery of cement copper in flotation without re-solution, and also to separate, regenerate and return to the leaching circuit the iron bearing tailing solution or a portion thereof. In contra-distinction to former processes this method precipitates a certain fraction of the dissolved iron prior to flotation and makes use of both the precipitated and dissolved forms in the subsequent steps.

Cement copper is very readily oxidized and dissolved by agitation with air in presence of free acid, the rate of dissolution increasing with the acid strength. Furthermore, copper is readily dissolved by such oxidizing agents as ferric sulphate. Following the precipitation reaction—

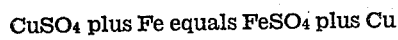
CuSO4 plus Fe equals FeSO4 plus Cu iron exists as ferrous sulphate solution. However, the action of air in the flotation cell may tend to produce some ferric sulphate which largely becomes hydrolyzed to sulphuric acid and a precipitate of basic ferric sulphate. Therefore, the normal conditions existing in a flotation cell are conducive to re-dissolving cement copper, even though the free acid may have been neutralized prior to flotation.

Re-solution of cement copper is to be avoided in flotation, not only on account of the loss of copper entailed but also because of the reaction between traces of copper in solution and certain flotation reagents, such as xanthates, which inhibits the flotation by consuming the reagent.

The use of precipitants in excess, or to completely eliminate the soluble iron is undesirable, due to the expense involved for precipitants and also to the injurious effect on flotation of a possible excess of alkali. Furthermore, iron sulphate may be required in subsequent stages of the process, regeneration of sulphuric acid by contacting sulphur dioxide and air with the ferrous sulphate tailing solution having been described in my co-pending applications, Ser. Nos. 561,159 and 561,160, filed Sept. 4, 1931. Also, the complete neutralization of acid prior to the precipitation of copper is dangerous practice due to the possibility of precipitating copper in a non-recoverable form.

By the use of my method the above difficulties are overcome, re-solution of copper prevented, an excess of alkali or precipitant avoided, the iron made available for regeneration of leaching solvent by virtue of its being partially maintained in solution, and furthermore the pulp is conditioned for effective flotation.

To accomplish this result the copper is first precipitated in finely divided condition by agitating the leached pulp with metallic iron in suitable form. When the degree of copper precipitation, as shown by the concentration of copper remaining in solution after contacting said pulp with metallic iron, is sufficiently complete for the purpose in hand an alkaline precipitant which preferably is appreciably soluble in water, such as soda ash or milk of lime, is added in a definite and limited quantity and agitated with the pulp. This first neutralizes the free acid and then precipitates a certain pre-determined fraction of the dissolved iron as a basic ferrous compound, such as ferrous hydroxide, a portion of the originally dissolved iron remaining in solution, this condition being effected by avoiding an excess of precipitant. The pulp, containing precipitated ferrous iron as well as ferrous iron in solution, is then subjected to standard flotation treatment. By this method both the precipitated and dissolved forms of iron perform distinct functions in the process here involved. The precipitant is preferably consumed in the agitation cell prior to flotation, so that there is generally no appreciable concentration of original precipitant present during flotation. The agitation of alkaline precipitant and pulp to precipitate the desired portion of the iron is best conducted without aeration so that the pulp is delivered to flotation with the precipitated iron in the ferrous condition. Thus the ferrous hydroxide will immediately neutralize the smallest trace of free acid, due to its basic nature, whereas a considerable concentration of free acid may exist in contact with ferric hydroxide, the latter not being capable of completely neutralizing free acid.

As acidity is definitely a function of hydrogen ion concentration, the latter being capable of wide variation, it is necessary to define neutrality as applied to the process in hand. It is here considered that a solution is neutral when both ferrous hydroxide and ferrous sulphate are present together in the concentrations mentioned below and are in equilibrium in the system.

In actual operation any tendency to produce ferric sulphate or sulphuric acid during flotation is immediately counteracted by the basic properties of the precipitated ferrous iron present in the pulp. Furthermore, the oxidizing effect of the flotation air is manifested upon this ferrous iron precipitate during flotation, gradually oxidizing it to the form of hydrated ferric oxide, which is also insoluble and has no action on the cement copper. Thus this ferrous precipitate, by preferential oxidation, protects the cement copper and assists in maintaining favorable conditions for flotation.

I have also found that by conducting the operation as here described the ferrous iron that is not precipitated by the alkaline precipitant remains as such in solution during flotation so that the desired quantity of iron in solution may be obtained for the regenerative steps of the process by decantation or filtration following flotation. This is a distinguishing feature of my method as compared to other processes in which the iron is completely precipitated by manipulation following the addition of a limited quantity of precipitant. The regenerative step, above mentioned, may employ sulphur dioxide and air to produce ferric sulphate and sulphuric acid by contacting with the above mentioned reclaimed iron bearing solution. However, it is not the intent to limit the claims of this method to the use of regeneration nor to any specific mode thereof.

It is also not the intention to confine the scope of this method to any narrow limits of iron concentration nor degree of iron precipitation. However, as an example of satisfactory operating conditions, I have found that after precipitation of cement copper but before adding the alkaline precipitant, the iron in solution may logically approximate 10 pounds of ferrous iron per ton of solution. Satisfactory results may then be obtained in both cement copper flotation and acid regeneration by precipitating, as above stated, from 10 to 90 percent of the iron originally in solution. Therefore, although both the precipitated and dissolved forms of ferrous iron function in this process, yet the amount of precipitant may be successfully varied over a wide range and the method readily adapted to a great variety of conditions.

As it may not always be feasible to return the iron bearing tailing solution to the leaching circuit, due to the solvent being secured from some other source, it may be preferable to discard the entire tailing pulp after conducting the precipitation steps and flotation as above described.

Any alkaline substance which will precipitate ferrous iron may be used, examples being milk of lime, soda ash, caustic soda, ammonia and dolomite or limestone. When rapidity of action is desired in iron precipitation the more soluble substances are advantageous.

Increasing the percentage of oxide copper in the ore results in a higher concentration of ferrous sulphate in the pulp and may require a greater amount of precipitant for the iron so as to prevent re-solution of copper as well as the possible deleterious effects of a high concentration of ferrous sulphate in the flotation circuit.

The successful operation of this process is made possible by maintaining a proper iron balance, the chemical control of the iron balance being effected by properly adjusting the addition of the alkaline precipitant, the ferrous iron in the pulp solution before and after addition of the alkaline precipitant being the index of the operating conditions.

I have found that by conducting the operation as above described the requisite hydrogen iron concentration for most effective flotation of cement copper is insured.

The above method may be applied, as far as flotation of cement copper is concerned, without regeneration and return to the leaching circuit of the iron bearing solution. It is also possible to use various physical forms of metallic iron, such as scrap, as a precipitant. However, I prefer to employ sponge iron precipitation together with solvent regeneration for reasons of efficiency and economy. In this connection it has been generally recognized in the art that by-product iron pyrite from concentrator operations may be logically employed for acid and sponge iron production and when feasible obtained by making a sulphide recovery and pyrite separation from the leaching ore prior to copper precipitation, the recovered pyrite being then roasted, the evolved sulphur dioxide made the basis for the leaching solvent and the roasted calcine being treated in a suitable furnace, such as described in my co-pending application (Serial No. 620,445, filed July 1, 1932) for reduction to sponge iron. The invention as given in this specification and set forth in the claims is an improvement on the previously known prior art above described.

Having described my method what I claim and desire patented is:

1. In a method of recovering copper involving precipitating dissolved copper with metallic iron in presence of the pulp, adding an alkaline precipitant to the pulp after precipitation of the copper, reacting of said alkaline precipitant with free hydrogen ions of the solution and thus lowering the hydrogen ion concentration of the solution to the value which permits precipitation of ferrous hydroxide, precipitating thereby a portion of the dissolved iron in the ferrous condition and retaining a portion of the iron in solution, subjecting said pulp containing both precipitated and dissolved iron to flotation and retaining said dissolved iron substantially in solution during flotation.

2. In a method of recovering copper involving precipitating dissolved copper with metallic iron in presence of the pulp, adding a basic precipitant to the pulp after precipitation of the copper, precipitating thereby a portion of the iron from solution in the ferrous condition and retaining a portion of the iron in solution, subjecting said pulp to flotation, recovering iron bearing solution therefrom after flotation, contacting said iron bearing solution with sulphur dioxide and then returning said solution to the leaching circuit.

3. In a method of recovering copper involving precipitating dissolved copper with metallic iron in presence of the pulp, adding a basic precipitant to the pulp after precipitating the copper, reacting of said alkaline precipitant with free hydrogen ions of the solution and thus lowering the hydrogen ion concentration of the solution to the value which permits precipitation of ferrous hydroxide, precipitating thereby from 10 to 90 per cent of the dissolved iron as a basic ferrous compound and subjecting the pulp to flotation in presence of both dissolved and precipitated forms of iron.

4. In a method of recovering copper involving precipitating dissolved copper with metallic iron in presence of the pulp and recovery of the precipitated copper by flotation, the use of a basic substance to precipitate a portion of the dissolved iron subsequent to copper precipitation and prior to flotation, maintaining a portion of the dissolved iron in solution during flotation and utilization of said dissolved iron from the flotation pulp for regeneration of ferric sulphate and sulphuric acid.

5. In a leaching-precipitation-flotation system as above described and which in addition involves production of ferric sulphate and sulphuric acid as a leaching solvent, control of the iron content of the solution system by addition and regulation of a basic precipitant between the steps of copper precipitation and flotation so that part of the dissolved iron is precipitated in the ferrous condition prior to flotation and a portion of the iron is maintained in solution during flotation, separation of iron-bearing solution from the flotation tailing pulp and use of said iron-bearing solution in the production of acid ferric sulphate leaching solvent.

6. In a method of recovering copper involving precipitating dissolved copper by metallic iron in presence of the ore pulp adding subsequently to copper precipitation a basic precipitant capable of precipitating ferrous iron, precipitating thereby a portion of the originally dissolved ferrous iron as a basic precipitate capable of neutralizing free acid and retaining a portion of the dissolved iron in solution, adding said ore pulp to the flotation circuit with precipitated iron still in the ferrous condition and recovering said precipitated copper by flotation.

7. In a method of recovering copper involving precipitating dissolved copper by metallic iron in presence of the ore pulp adding subsequently to copper precipitation a water soluble basic precipitant capable of precipitating ferrous iron, precipitating thereby a portion of the originally dissolved ferrous iron as a basic precipitate capable of neutralizing free acid and retaining a portion of the dissolved iron in solution, adding said ore pulp to the flotation circuit with precipitated iron still in the ferrous condition and recovering said precipitated copper by flotation.

8. In a method of recovering copper involving precipitating dissolved copper by metallic iron in presence of the ore pulp adding subsequently to copper precipitation a water soluble basic precipitant in such limited amounts as to react quantitatively with the solution, thus substantially consuming the basic precipitant and producing in its stead a precipitate of ferrous iron capable of neutralizing acid, thus leaving a portion of the dissolved iron in solution, adding said ore pulp to the flotation circuit with precipitated iron still in the ferrous condition and recovering said precipitated copper by flotation.

9. In a method of recovering copper involving precipitating dissolved copper with metallic iron in presence of the pulp, adding milk of lime in such limited quantities to the ore pulp after copper precipitation that the milk of lime is substantially consumed by reacting with the ferrous sulphate to produce a basic ferrous precipitate and that a portion of the dissolved iron remains in solution, subjecting said pulp containing both the precipitated and dissolved forms of ferrous iron to flotation and retaining dissolved ferrous iron in solution during flotation.

HARMON E. KEYES.

Patent No. 1,971,416 Granted August 28, 1934
HARMON E. KEYES

The above entitled patent was extended October 2, 1951, under the provisions of the Act of June 30, 1950, for 6 years and 82 days from the expiration of the original term thereof.

*Commissioner of Patents.*